United States Patent Office 3,157,953
Patented Nov. 24, 1964

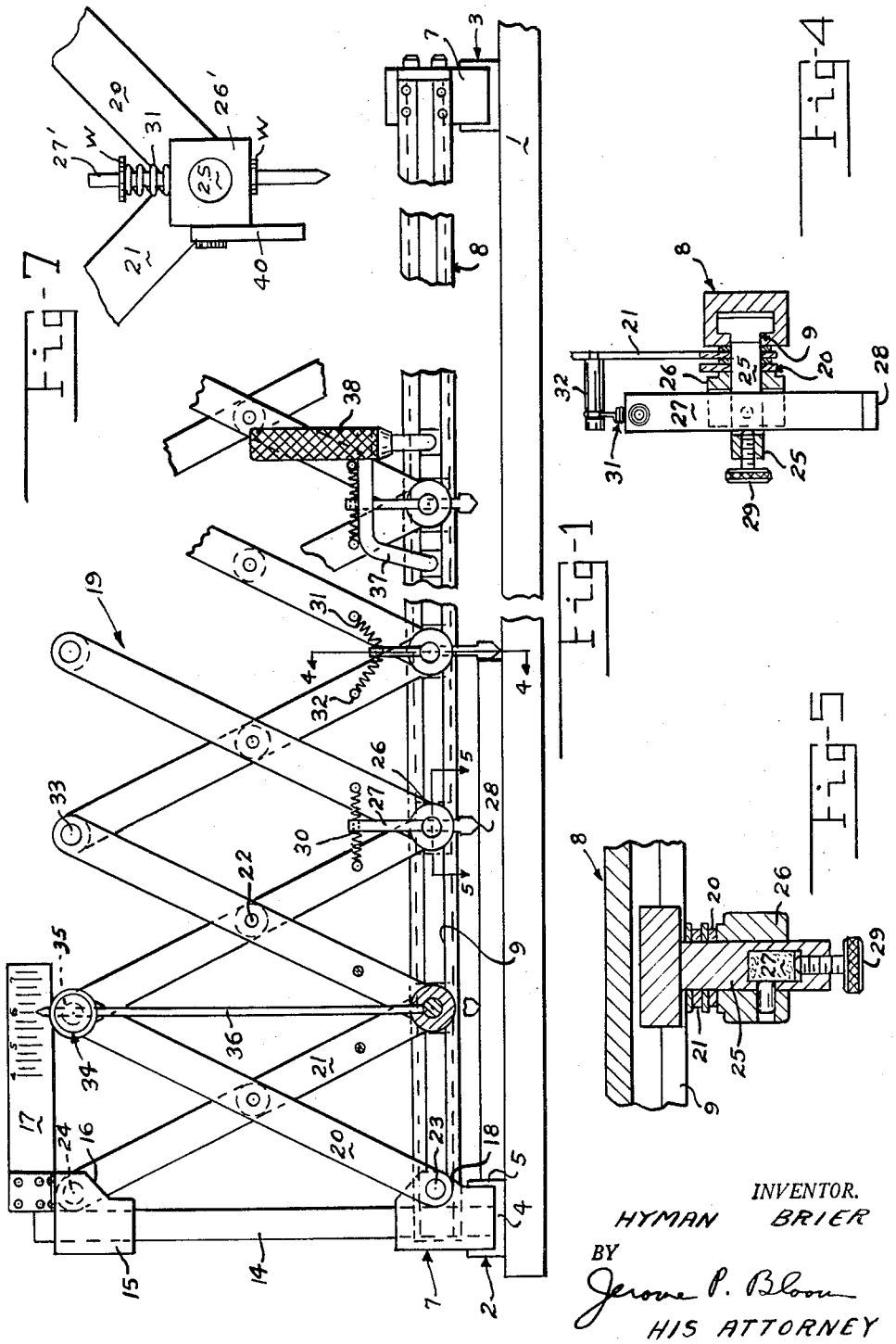

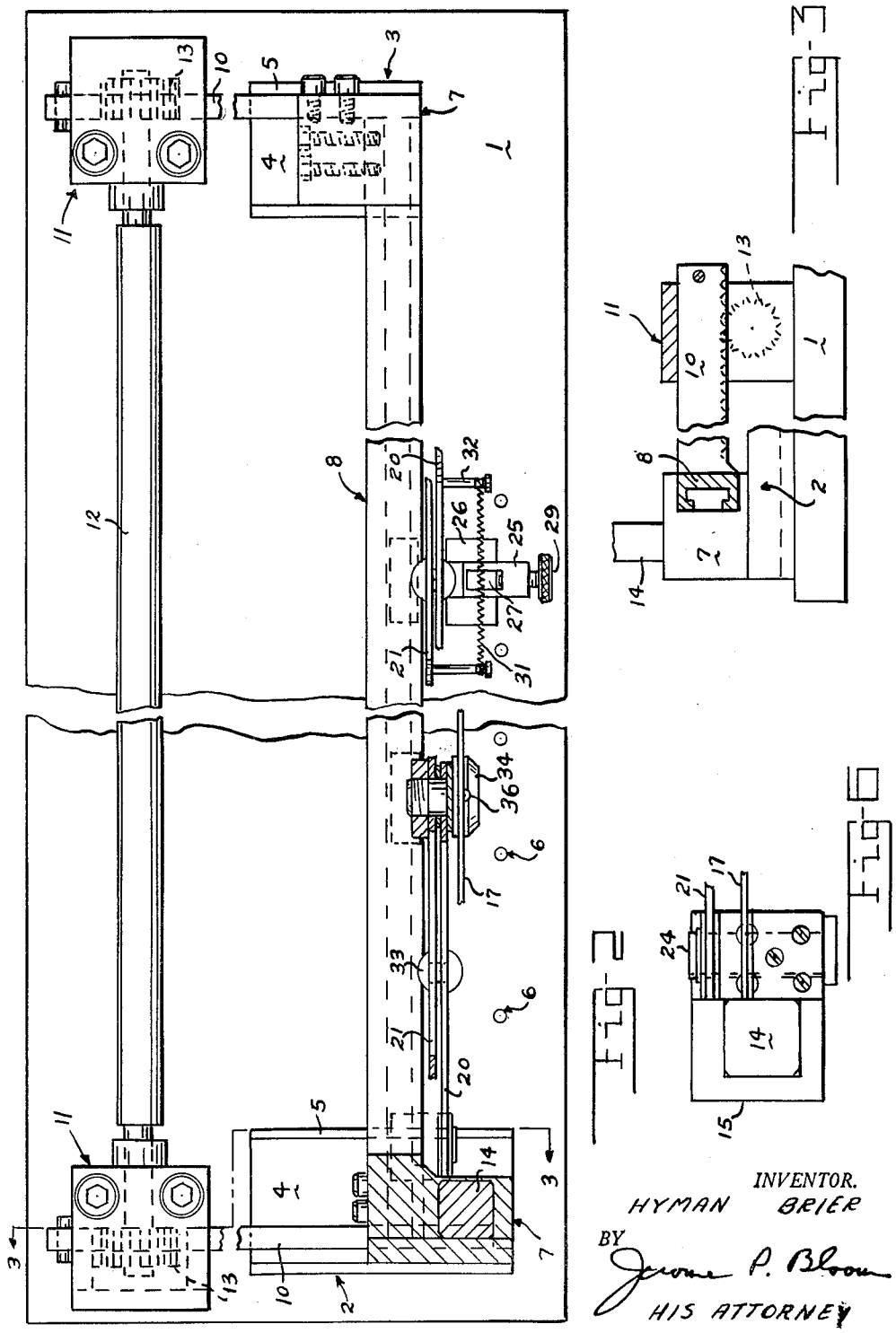

3,157,953
PICKET SPACING MECHANISM
Hyman Brier, 1423 Kumler Ave., Dayton, Ohio
Filed Dec. 5, 1960, Ser. No. 73,766
11 Claims. (Cl. 33—192)

This invention relates to measuring and marking apparatus. It provides apparatus particularly applicable for measuring bars, plates and the like so as to automatically and selectively divide them into sections of equal length intermediate their extremities which may differ in length from equal portions defined thereby to their respective ends.

Embodiments are advantageous in application to the fabrication of metal picket-type fencing such as employed for enclosing porch structures and the invention will be particularly described herein with reference thereto. However, it should be obvious therefrom that the form of embodiments and application of the invention is not so limited and such is not intended.

The manufacture of picket fence sections is a laborious procedure. The major reason is that the bars which connect the pickets must be carefully marked off to insure that the points of application of the pickets will be generally equidistant. The problem this presents is complicated by the fact that not only must the pickets be equidistantly spaced within the extremities of the bars but for purposes of symmetry it is required that the length of the end portions of the bars be equal though generally different from the distances established between the intermediate pickets. Prior to the present invention the measuring and marking of these bars has been done manually and with questionable precision.

The present invention provides a very simple and effective tool which solves the above problem and expedites the fabrication of picket fences at minimum cost. It enables a quick precision measurement and marking of the picket mounting bars so as to establish equidistant points thereon intermediate their extremities, irrespective of bar length, and also insures that the length of the respective end portions of the bar are equal. In addition, the invention tool enables any number of pickets to be quickly provided within a given length of fencing. Invention embodiments are also characterized by novel positioning and marking means enabling a bar or other work piece to be accurately and effectively positioned and marked with expenditure of a minimum of effort and cost.

A primary object of the invention is to provide improvements in measuring and marking apparatus which renders such apparatus economical to fabricate, more efficient and satisfactory in use, adaptable to a wide variety of applications and unlikely to malfunction.

Another object of the invention is to provide novel measuring apparatus capable of quickly and automatically establishing equidistant points on a surface.

A further object of the invention is to provide an improved tool for positioning, automatically establishing, and marking equidistant points on a bar or plate including means automatically providing equally but differently spaced points to either end of the bar or plate.

An additional object of this invention is to provide a novel tool for automatically establishing equidistant points on a bar, plate, or the like including normally inoperative marking elements which may optionally function as work holding elements.

Another object of the invention is to provide an improved tool for establishing selectively spaced equidistant points on a work surface including novel work positioning means minimizing the labor attendant thereto.

An object of the invention is to provide measuring and marking apparatus, embodiments of which are particularly applicable to fabrication of picket fences and the like, possessing the advantageous structural features, the inherent meritorious characteristics and means and mode of operation herein described.

With these and other objects in view which will become more readily apparent from the following specification and claims, the invention intended to be protected by Letters Patent consists of the features of construction, the parts and combinations thereof, and their means and mode of operation as hereinafter described or illustrated in the accompanying drawings, or their equivalents.

Referring to the drawings, wherein a single but not necessarily the only form of embodiment and application of the invention appears, FIG. 1 is a fragmentary front elevation view of picket spacing mechanism embodying the inventive concepts;

FIG. 2 is a top view of apparatus such as shown in FIG. 1, parts being broken away for clarity of disclosure;

FIG. 3 is a sectional view of the invention apparatus taken on line 3—3 of FIG. 2, parts being eliminated for clarity of disclosure;

FIG. 4 is a sectional view taken on line 4—4 of FIG. 1;

FIG. 5 is a sectional view taken on line 5—5 of FIG. 1;

FIG. 6 is a fragmentary top view of FIG. 1; and

FIG. 7 is a fragmentary elevation view showing a preferred modification of the apparatus of FIGS. 1–5.

The invention can be best described with particular reference to the accompanying drawings. The embodiment illustrated is established on a table or base plate 1 having guide members 2 and 3 fixed in parallel spaced relation on its upper surface, respectively to the left and the right thereof, as viewed in the drawings. The guide members are channel-shaped in cross-section and include a base plate 4 and parallel vertically projected side plates 5 formed integral therewith. It will be noted from FIG. 2 of the drawings that the members 2 and 3 are oriented to run from front to rear of the base 1 and that the member 3 is shorter and has its forward extremity displaced rearwardly of the forward extremity of the guide member 2. A series of magnets 6 are inserted in the base 1 on a line at right angles to the forward extremity of the member 2 and in the direction of the guide member 3, for purposes to be further described.

Nested for slidable movement within and longitudinally of each guide member is a block unit 7. The blocks 7 are fixedly connected at points equidistant from the base 1 by a generally C-shaped guide 8 oriented to define a slot 9 longitudinally thereof facing forwardly of and arranged parallel to the base 1. Rack elements 10 are fixed to extend rearwardly of the respective block units 7 in parallel relation. Directly aligned with and to the rear of each of the guide members is a housing 11 anchored to the base 1. A shaft 12 extends between the housings 11 in a sense parallel to the guide 8. The respective ends of the shaft 12 rotatably mount in the respective housings 11. Fixed to rotate with the shaft 12 within each housing 11 is a gear 13. The rack elements 10 project through openings in the respectively aligned housings 11 to mesh with the gears 13 therein. Thus, it may be seen that uniform conjoint movement of the block units 7 forwardly or rearwardly on the base 1 is positively insured by the connection of the guide 8 and the meshing relation of the racks 10 and gears 13.

Connected at its lower end to the block 7 in the guide member 2 is a post 14 which projects vertically of the base 1. A sleeve 15 which slidably mounts about the upper end of the post 14 has a radial extension in the direction of the guide member 3 oriented in a plane at right angles thereto. This radial extension provides a bracket 16 which supports one end of a graduated scale plate 17. The plate 17 is positioned in a plane at right angles to the guide members 2 and 3 and functions in a manner to be further described.

The block assembly 7 forming the base of the post 14 also has a bracket portion 18 which is integrally connected to project in a direction at right angles to the guide members and co-planar with the bracket 16. Pivotally anchored at one end to the brackets 18 and 16 is a scissors type expansion assembly 19. The assembly 19 is oriented vertically of the base 1 and includes pairs of identical narrow elongated bars or plates 20 and 21 which are pivotally connected at their centers 22. As may be seen from FIG. 1 of the drawings, the pairs of pivotally connected bars 20 and 21 are successively arranged to the right of post 14 and pivotally connected in a conventional manner at their adjacent ends except for modifications to be further described herein. The ends of the bars 20 and 21 immediately adjacent the post 14 are respectively pivotally connected by a pin 23 to the bracket 18 and by a pin 24 to the bracket 16. An important feature to be observed from FIG. 1 of the drawings is the fact that the central axes of the respective pins 23 and 24 lie in a plane common to the inner vertical surface of guide member 2 to the right of post 14. The significance of this will appear further herein.

The pivot pins 25 which connect the lower extremities of adjacent bars 20 and 21 of the expansion assembly 19 have T-shaped heads to one end slidably contained within the C-shaped guide 8 and project outwardly through the slot 9 at right angles thereto.

Each pivot pin 25 has a bushing 26 thereabout outwardly of the guide 8 and confining the ends of the bars 20 and 21 pivoted thereon with washers interposed therebetween. Each pin 25 and associated bushing 26 have aligned rectangular apertures which are oriented vertically of the base 1 through their central axes. The aligned apertures accommodate the projection of a rectangular chalk element 27 therethrough, the lower end of which is tapered to a central line 28 running parallel to the guide members 2 and 3. A set screw 29 engages through the outer end of the pin 25 and is adapted to selectively fix the chalk element in any position of vertical adjustment with respect to the pin.

Thus, the expansion assembly 19 is confined to and guided at its lower end by the guide 8 through the medium of pivots 25 beyond the anchor pivot 23. The pivot 23 is, of course, laterally aligned with the pivots 25. In this manner it is provided that the assembly 19 will generally define a plane at right angles to the guide members 2 and 3. Also, the chalk elements 27 which are vertically projected through the pivot pins 25 jointly define a plane forwardly of and parallel to the general plane of the assembly 19.

The successively adjacent chalk elements 27 are arranged to have axially aligned apertures 30 in their upper ends. It should be noted that the respective elements 27 continuously bisect the angle defined by the bars 20 and 21 pivotally connected on their associated pivot pins 25. Each chalk element 27 is provided with a coil suspension spring 31 which extends through its aperture 30 to have the respective ends thereof fixed to pins 32 equidistant from either of opposite sides of the chalk element on the respectively associated bars 20 and 21. It may be seen that with the set screws 29 in normal chalk releasing positions in the pins 25 that the chalk elements 27 are biased upwardly from the base 1 by the springs 31, limited by relatively enlarged head portions on the lower ends of the chalk members abutting bushings 26.

The pivotal connection of adjacent upper ends of successive pairs of bars 20 and 21 of the expansion assembly beyond the anchor pivot 24 is effected by pivot pins 33. Each pin 33 consists of a bolt having a head 34 to its outer end and a nut or similar element to its inner end between which are pivotally confined the associated ends of a pair of bars 20 and 21.

The head 34 of the pin 33 providing the connection of the upper ends of bars 20 and 21 most adjacent the anchor pivot 24 has an aperture 35 therethrough oriented vertically of the base 1. The bushing 26 on pivot pin 25 immediately below has the lower end of an indicator rod 36 anchored therein. The rod 36 projects vertically through aperture 35 to have its pointed upper extremity serve as a pointer with reference to the scale plate 17.

The assembly 19 thus provided may be expanded and contracted. Since the path of movement of the lower pivots 25 is fixed, the path of movement of the pivots 33 is fixed, the sleeve 15 sliding up and down the post 14 to accommodate such movement. It should be obvious from the drawings and the above description that on expansion and contraction of the assembly 19 by movement from and to the post 14 the successive distances between centers of the successively adjacent pivot pins 25 will always be equal. Also, as the tapered ends of the chalk elements 27 include these centers, they will always be equidistant. It must be noted here that the thickness of the head to the lower end of each chalk element is such that one-half thereof is equal to the thickness of the side plate 5 below and to the right of center of the anchor pivot 23. Thus, not only will the distances between the tapered extremities of the successive chalk elements 27 always be equal but the distances respectively between the innermost side of plate 5 of guide member 2 and the tapered end of the most adjacent of the chalk elements 27 and from the tapered end of any subsequent chalk element 27 to the most adjacent surface portion of the head of the following element 27 will be equal. The purpose of this will be described with reference to application of the invention embodiment.

Noting FIG. 1 of the drawings, it will be seen that the right hand end of the guide 8 remote from the post 14 has an inverted U-shaped handle 37 affixed thereto the upper end of which is projected forwardly and upwardly thereof and has a vertically projected rod 38 to one end. The handle 37 may be manipulated very easily to move the block units 7 forwardly and rearwardly on the table 1 within the guide members 2 and 3 to establish the expansion assembly 19 and the chalk elements 27 in selected planes. As mentioned previously, the control of the racks 10 by the gears 13 insures that the planes to which the expansion assembly is moved are continuously parallel.

Use of the invention apparatus may be clearly observed with reference to FIG. 1 of the drawings. Here it may be seen in application to marking off picket mounting bars to be used in fabricating sections of metal picket type fences. It of course is obvious that each bar must be identically and precisely marked to insure ease and accuracy of fabrication. The purpose of the magnets 6 now become apparent. The picket mounting bars B are rectangular. Therefore, a bar B may be positioned on the upper surface of the base 1 over the magnets 6 to have one end about the inner side of the guide member 2 and project at right angles thereto. The bar B is fixedly held in this position by the magnets 6 on a line spaced forwardly of the forward extremity of the guide member 3 and at right angles thereto. By grasping the handle 37 or attached rod 38 the expansion assembly 19, which is normally rearwardly of this line, may be moved forward in continuously parallel planes to establish the chalk elements 27 in advance thereof over the upper surface of the bar B. At this point the assembly 19 may be expanded from the post 14 to a degree, dependent upon the number of pickets to be applied to the bar B, to enable a single chalk member 27 to be manually depressed to the base 1 against the bias of its suspension spring to have the side of its expanded head positioned in abutment with the projected extremity of the bar B. By fixing the chalk member 27 in its so depressed position by adjusting set screw 29 in its associated pin 25, the bar B is effectively and precisely contained to the guide member 2. The engagement of the member 27 to base 1 also fixes the position of the pivots 25 in assembly 19. Since the expansion assembly is such that the central axes of pivot pins 25 and therefore the lines defined at the tapered lower extremities of the chalk member 27 are continuously equidistant, regardless of expansion or contraction of assembly 19, the distance established between anchor pivot 23 and the most adjacent pivot 25 will equal the distance between each successive pair of pivots 25. This distance is inherently indicated by the pointer of rod 36 on the scale 17. Then, by manually depressing each chalk member 27 intermediate anchor pivot 23 and the fixedly depressed chalk member 27, a precise division of the bar will be marked off. The spacing between the marks intermediate the ends of the bar will be identical. The end portions of the bar as marked off will be equal in length but automatically differ by the thickness of the plate section 5 of guide member 2 which is equal to one-half the width of the expanded head of chalk members 27.

By predetermining the number of pickets to be applied between extremities of any one bar or plate B, one need merely expand the assembly 19 only to the degree that rod 36 indicates that distance required on scale 17. Then one need only depress the chalk 27 in line with the end of the bar or plate B and fix it to effectively contain the bar to the guide member 2 and establish the relative positions of the chalk members 27 intermediately thereof which may then be quickly depressed to mark equidistant lines on the bar B. Each line marked will indicate a point of attachment of a picket bar in a manner believed obvious.

The speed and accuracy positively enabled with the invention apparatus is readily apparent. There is no waste motion or effort involved in its use. The manner of containment of the pivots 25 of the assembly 19, as anchored to post 14, along with the controlled conjoint movement of block unit 17 insures the continuously vertical position of the assembly 19. This insures accuracy of measurement and marking. It is of course obvious the marking members 27 may be of metal or equivalent material having the character of a "scratchall."

The apparatus illustrated may be similarly applied to bars or plates of indeterminate length to quickly ascertain the number of equidistant positions most logically applicable for their desired use. It is to be noted the simplicity and effectiveness of the character, suspension and orientation of the chalk members 27 provides a prime feature of the invention. The dual function of the chalk members or their equivalents as markers and holding or positioning elements is unique.

It may thus be seen that the improvements of the invention renders substantial economies and efficiencies in the art, particularly in the area of application described.

FIG. 7 of the drawings shows a preferred modification of the above described embodiment of the invention relating to the marking and positioning elements employed. As schematically shown, in this instance bushings 26' are employed on the pins 25 which are preferably rectangular in outer configuration, rather than cylindrical as in the case of bushings 26, but otherwise similarly apertured and positioned with reference to the pins 25. Also, "scratchall" metal pins 27' having pointed lower extremities are employed here rather than chalk members 27.

Each pin 27' has parallel washers W fixed in spaced relation thereon, one above and one below the associated bushing 26' and pin 25. A spring 31' is positioned about pin 27' between the upper washer W and the top of bushing 26' to normally bias the pin 27' to an uppermost position displaced from the base 1.

In using this form of marker assembly, the set screw 25 is eliminated and a flipper arm 40 is pivotally mounted to one side of the bushing 26' and adapted to be frictionally contained by suitable means in a raised or dependent position with respect thereto. In its dependent position arm 40 serves as a positioning means for containing a bar B to the guide member 2 on appropriate expansion of the assembly 19 in a manner as previously described with reference to the edge of the markers 27. The spacing between the point of the marker element 27' and the side of the flipper 40 most adjacent member 2 is arranged to be equal to the thickness of the plate section 5 so the use and function of the invention apparatus as modified will generally be the same as in the case of the embodiment first described.

From the above description it will be apparent that there is thus provided a device of the character described possessing the particular features of advantage before enumerated as desirable, but which obviously is susceptible of modification in its form, proportions, detail construction, and arrangement of parts without departing from the principle involved or sacrificing any of its advantages.

While in order to comply with the statute, the invention has been described in language more or less specific as to structural features, it is to be understood that the invention is not limited to the specific features shown but that the means and construction herein disclosed comprise but one of several modes of putting the invention into effect and the invention is therefore claimed in any of its forms or modifications within the legitimate and valid scope of the appended claims.

Having thus described my invention, I claim:

1. For use on a flat base, measuring and marking apparatus comprising parallel guide means, further guide means oriented at right angles to said parallel guide means, anchor means vertically mounted for movement longitudinally of said parallel guide means, said further guide means extending between and connecting to said anchor means for conjoint movement therewith, expansible means connected at one end to one of said anchor means and expansible towards the other of said anchor means, means slidably interconnecting said expansible means and further guide means to provide a straight line expansion of said expansible means and having therein means defining continuously equidistant points on said expansible means selectively and variably adjustable to transmit the positions of the points to the surface of an article oriented on the flat base.

2. Measuring and marking apparatus for application to a bar, plate or the like, comprising, parallel guide means mounted on a base surface, post means slidably mounted in one of said guide means to project vertically therefrom, said post means having a fixed pivot and a pivot which is vertically adjustable thereon, an expansible frame one end of which connects to said pivots, said pivots thereby establishing said frame in a generally vertical plane referenced to said base surface, further post means slidably mounted in the other of said parallel guide means, a guide frame connecting said post means, gear controlled means connected with and providing a conjoint movement of said post means and guide frame, means slidably relating said expansible frame to said guide frame to provide that its expansion and the contraction is limited to a straight line, marker means positioned in said expansible frame and referenced to the aforementioned pivots to define a series of points which are continuously equidistant irrespective of the degree of expansion or contraction of said expansible frame, said marker means normally having a degree of vertical freedom and being normally biased from said surface and any article which may be positioned thereon, said marker means being movable with said expansible frame to position over the article and being arranged for selective depression to selectively mark the article thereunder.

3. The structure as set forth in claim 2 wherein the means slidably relating the expansible frame to said guide frame are pivots in said expansible frame having expanded end portions contained in said guide frame and said marker means are arranged to project through said pivots and have expanded head portions to their lower extremities providing an upper limit to movement thereof under the influence of the bias thereon.

4. The structure as set forth in claim 2 wherein the said one of said guide means and one of said marker means are arranged to optionally function to fix the position of an article on said base surface for marking thereof.

5. The structure as set forth in claim 4 and magnet means in said surface arranged on a line perpendicular to said parallel guide means for holding an article in a selected position thereon.

6. Measuring and marking apparatus comprising an expansible frame, means mounting said frame with reference to a base surface for movement into successive relative parallel planes generally perpendicular to said base surface, said mounting means including anchor means fitted to one end of said frame and guide means connected with a vertical extremity of said frame to provide said frame with a controlled path of movement, means included in said frame establishing points intermediate its extremities which are continuously equidistant, irrespective of the degree of expansion of said frame, said included means having marking means therein normally biased upwardly and away from said base surface and operable to translate said points to a surface of an article oriented on the base surface and providing means for selectively containing the article with reference to said anchoring means.

7. Measuring and marking apparatus comprising, an expansible frame, means anchoring one end of said frame to establish it in a vertical plane referenced to a base surface, means on said frame, spaced intermediate the ends thereof, adapted to remain continuously equidistant irrespective of expansion or contraction of said frame, means connected to said frame and said anchor means to define a straight line path of expansion for said frame, said continuously equidistant means including resiliently suspended marker means which project therethrough to normally have a freedom of vertical movement, said marker means being biased upwardly and away from said base surface and arranged to be variably and selectively and independently depressed against the bias thereon to measure and mark off selectively spaced points on the surface of an article oriented on said base surface therebelow and said marker means being arranged to optionally serve in conjunction with said anchor means as a work holding means for said article.

8. Measuring and marking apparatus comprising, an expansible frame, means anchoring one end of said frame to establish it in a vertical plane referenced to a base surface, means on said frame, spaced intermediate the ends thereof, adapted to remain continuously equidistant irrespective of expansion or contraction of said frame, means operatively connecting to said frame and anchor means to define a straight line path of expansion for said frame, said continuously equidistant means including resiliently suspended marker means which are biased upwardly and away from and have a freedom of vertical movement with reference to said base surface, said marker means being variably and selectively depressible against the bias thereon to measure and mark off selectively spaced points on the surface of an article therebelow, means in connection with said anchor means providing an abutment for one end of the article and said marker means being selectively operable to contain the article to said abutment and being so formed whereby the article may be marked off by equidistant points intermediate its extremities so as to leave equal portions thereof to either end.

9. Measuring and marking apparatus comprising, a pair of parallel guide members mounting to a base surface, a support element in each of said guide members, a guide frame connecting said support elements for conjoint movement in said guide members, means in simultaneous operative connection with said support elements to limit the movement thereof in said guide members to successively parallel planes, anchor means on one of said support elements, an expansible frame mounting at one end to said anchor means and having a portion thereof operatively related to said guide frame to provide a controlled path for its expansion which limits its orientation to a vertical plane referenced to said base surface and means included in said frame establishing points which are continuously equidistant irrespective of the degree of expansion of said frame, each including a marking element normally having a freeodm of vertical movement said marking elements being seleciively depressible to mark equidistant points on an article therebelow and providing means for selectively positioning an article with reference to said anchor means.

10. Measuring and marking apparatus used in conjunction with a base surface supporting a work piece to be measured and marked comprising, parallel guide means positioned on said base surface, post means mounting in said guide means to project vertically therefrom, one of said post means having vertically spaced thereon a relatively fixed pivot and a vertically adjustable pivot, said pivots being vertically aligned, an expansible frame one end of which is anchored to said pivots, guide means interconnecting with said frame and post means providing that said frame expands and contracts in a straight line, pivot means arranged in said frame, referenced to said fixed pivot, arranged to be continuously equidistant irrespective of the degree of expansion or contraction of said frame, marker elements resiliently suspended from said frame, biased upwardly and away from said base surface and extending through said last mentioned pivot means with a freedom of vertical movement, means at the base of said one post means for abutment of one end of the work piece to be measured and marked, a selective one of said marker means providing means for selectively confining the work piece to said abutment means to have a portion thereof orient in a plane common to said marker means.

11. The structure as set forth in claim 10 characterized by said abutment means being oriented between said post means and the pivot means of said frame most adjacent thereto whereby to displace the abutting end of the work piece from the post means in a manner that depression of the respective marker means intermediate said post means and the work containing marker means will cause equal portions of the work piece to be marked off intermediate its contained extremities in a manner to leave equal portions at its respective ends.

References Cited in the file of this patent

UNITED STATES PATENTS

| | | |
|---|---|---|
| 664,759 | Joy | Dec. 25, 1900 |
| 791,235 | Allen | May 30, 1905 |
| 824,867 | Houghton | July 3, 1906 |
| 927,110 | Campbell | July 6, 1909 |
| 1,023,561 | Green | Apr. 16, 1912 |
| 1,346,646 | Gallagher | July 13, 1920 |
| 1,424,988 | Coughtry | Aug. 8, 1922 |
| 1,615,668 | Anderson | Jan. 25, 1927 |
| 1,695,457 | Duncan | Dec. 18, 1928 |
| 2,822,736 | Padgett | Feb. 11, 1958 |